US012712747B2

(12) United States Patent
Patel

(10) Patent No.: US 12,712,747 B2
(45) Date of Patent: Aug. 18, 2026

(54) SECURE CHANNEL INITIATION BETWEEN CARD AND HOST

(71) Applicant: Giesecke+Devrient Mobile Security Germany GmbH, Munich (DE)

(72) Inventor: Praveen Patel, Pune (IN)

(73) Assignee: GIESECKE+DEVRIENT MOBILE SECURITY GERMANY GMBH, Munich (DE)

( * ) Notice: Subject to any disclaimer, the term of this patent is extended or adjusted under 35 U.S.C. 154(b) by 87 days.

(21) Appl. No.: 18/804,381

(22) Filed: Aug. 14, 2024

(65) Prior Publication Data

US 2025/0062920 A1 Feb. 20, 2025

(30) Foreign Application Priority Data

Aug. 14, 2023 (IN) ............................. 202321054552

(51) Int. Cl.
*H04L 9/32* (2006.01)

(52) U.S. Cl.
CPC .................................. *H04L 9/3271* (2013.01)

(58) Field of Classification Search
CPC ... H04L 9/0838; H04L 9/3271; G06F 21/606; G06F 21/77
See application file for complete search history.

(56) References Cited

U.S. PATENT DOCUMENTS 6,005,942 A * 12/1999 Chan .................. G06Q 20/3552 713/172
2024/0370547 A1* 11/2024 Gouabau .............. G06Q 20/341

FOREIGN PATENT DOCUMENTS

JP 2017139697 A * 8/2017
JP 2018082246 A * 5/2018
JP 2018113504 A * 7/2018

OTHER PUBLICATIONS

Global Platform. "GlobalPlatform Technology Secure Channel Protocol '04' Card Specification v2.3—Amendment K Version 0.0.0. 24", Jul. 2022. (Year: 2022).*
Global Platform "GlobalPlatform Technology Card Specification Version 2.3.1", Mar. 2018. (Year: 2018).*
Fukaya Muneyuki et al. JP 2017139697 A (machine translation), published Aug. 10, 2017. (Year: 2017).*
Funatsu Naoto. JP 2018082246 A (machine translation), published May 24, 2018. (Year: 2018).*
Kobayashi Ayumi. JP 2018113504 A (machine translation), published Jul. 19, 2018. (Year: 2018).*
Yubico. "YubiKey 5 Series Technical Manual", 2021. (Year: 2021).*
GlobalPlatform. "GlobalPlatform Technology Secure Channel Protocol '04' Card Specification v2.3—Amendment K Version 1.0", Jul. 2023. (Year: 2023).*
GlobalPlatform Technology, Secure Channel Protocol '03', Card Specification v2.3—Amendment D, Version 1.1.2, as Early as Mar. 1, 2019.

* cited by examiner

*Primary Examiner* — Michael Simitoski
(74) *Attorney, Agent, or Firm* — Workman Nydegger

(57) ABSTRACT

A procedure is provided for initiating a secure communication session between a card and a host. A static encryption key is assigned to the card and stored in the card. Each of the card and the host provide a key version number and a key identifier of the static key.

5 Claims, 4 Drawing Sheets

Initialize Update command

| Code | Value | Meaning |
|---|---|---|
| CLA | 80-83 | See section 11.1.4 |
| INS | 50 | INITIALIZE UPDATE |
| P1 | xx | If P1 < 0xFF – P1 = key version<br>If P1 = 0xFF - SCP key identity in data field |
| P2 | 00 | Key identifier if P1 is < 0xFF |
| LC | 08 | Length of host challenge + Length of SCP key identity |
| data | xx ..xx | Host challenge |
| data | yy . yy | SCP key identity (Fig. 4) |
| Le | 00 | |

Initialize Update reply

| Description | length | Presence |
|---|---|---|
| Key diversification data | 10 | Mandatory |
| Secure channel information | 1 | Mandatory |
| Card challenge | 8 | Mandatory |
| Card cryptogram | 8 | Mandatory |
| Sequence Counter | 3 | Mandatory |

Card challenge generation:

| 12 byte "label" consisting of 11 bytes with value '00' followed by a one byte derivation constant as per GP2.3 | 00 | 2 byte specifying the length in bits | A 1 byte counter | sequence counter (3 bytes) + AID of the application + 2 byte key version and key index associated with SCP key identity |
|---|---|---|---|---|

Static key(ENC) — Crypto function → Card Challenge (8 leftmost bytes)

Session key generation:

| 00 00 00 00 00 00 00 00 00 00 00 04 | 00 | 00 40 | 01 | Host Challenge(8 bytes) + card Challenge(8 bytes) |
|---|---|---|---|---|

Static key ENC — Crypto function → S-ENC

Initialize Update command

| Code | Value | Meaning |
|---|---|---|
| CLA | 80-83 | See section 11.1.4 |
| INS | 50 | INITIALIZE UPDATE |
| P1 | x | Key Version Number |
| P2 | x | Key Identifier |
| LC | 08 | Length of host challenge |
| data | xx ..xx | host challenge |
| Le | 00 | |

Initialize Update reply

| Description | length | Presence |
|---|---|---|
| Key diversification data | 10 | Mandatory |
| Key information | 3 | Mandatory |
| Card challenge | 8 | Mandatory |
| Card cryptogram | 8 | Mandatory |
| Sequence Counter | 3 | Mandatory |

Card challenge generation:

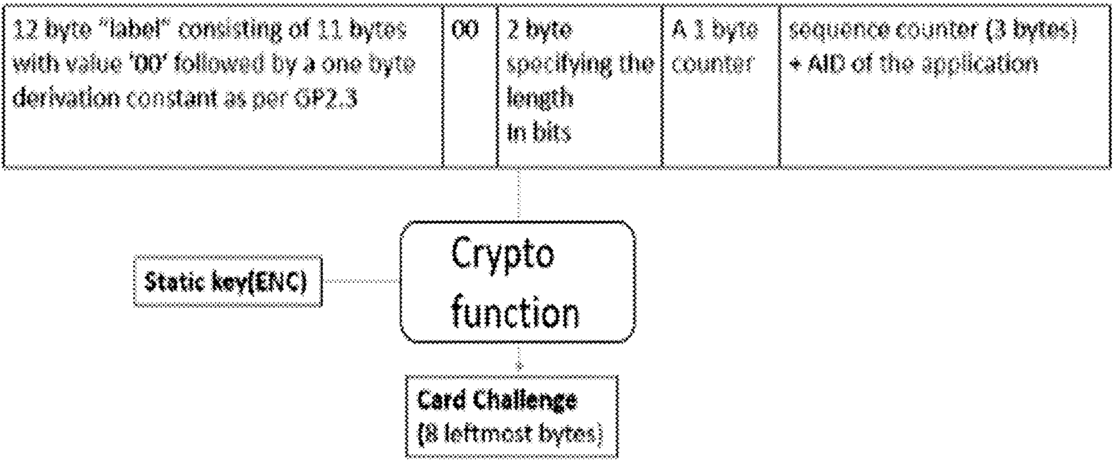

Session key generation :

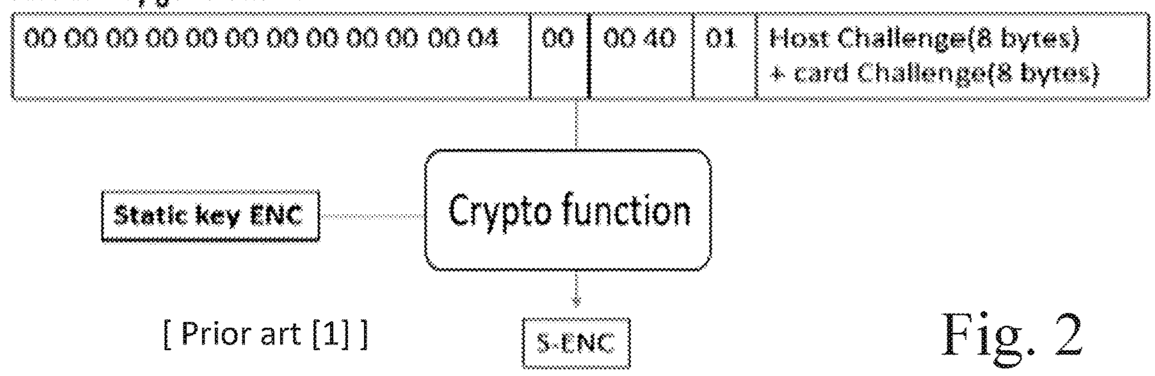

Initialize Update command

| Code | Value | Meaning |
|---|---|---|
| CLA | 80-83 | See section 11.1.4 |
| INS | 50 | INITIALIZE UPDATE |
| P1 | xx | If P1 < 0xFF – P1 = key version<br>If P1 = 0xFF - SCP key identity in data field |
| P2 | 00 | Key identifier if P1 is < 0xFF |
| LC | 08 | Length of host challenge + Length of SCP key identity |
| data | xx ..xx | Host challenge |
| data | yy ..yy | SCP key identity (Fig. 4) |
| Le | 00 | |

Initialize Update reply

| Description | length | Presence |
|---|---|---|
| Key diversification data | 10 | Mandatory |
| Secure channel information | 1 | Mandatory |
| Card challenge | 8 | Mandatory |
| Card cryptogram | 8 | Mandatory |
| Sequence Counter | 3 | Mandatory |

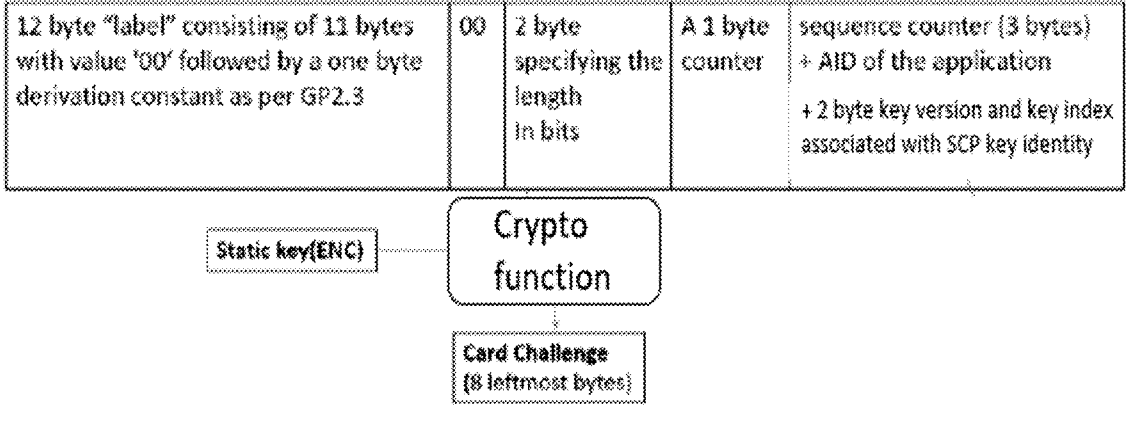

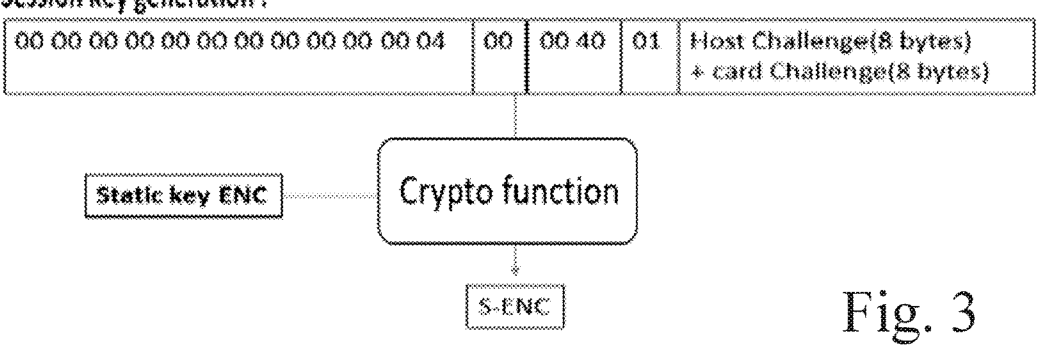

Fig. 3

| Description | Length [byte] | Presence |
|---|---|---|
| Security parameter tag | 1 | Mandatory |
| Length | 1 | Mandatory |
| Length of SCP key identity | 1 | Mandatory |
| SCP key identity | 1-10 | Mandatory |
| Length of key version / key identifier | 1 | Mandatory |
| Key version / key identifier | 2 | Mandatory |

Fig. 4

SECURE CHANNEL INITIATION BETWEEN CARD AND HOST

FIELD OF THE INVENTION

The present invention relates to secure channel initiation between a card and a host.

BACKGROUND OF THE INVENTION AND PRIOR ART

Document [1] [GPC_SPE_014] GlobalPlatform Technology, Secure Channel Protocol '03', Card Specification v2.3—Amendment D, Version 1.1.2, March 2019, describes the initiation of a secure channel between a card and a host, using an INITIALIZE UPDATE command sent from the host to the card, and an INITIALIZE UPDATE reply sent from the card to the host.

The INITIALIZE UPDATE command and INITIALIZE UPDATE reply according to [1] comprise confidential data, particularly a key version number and a key identifier of a secret card's static encryption assigned to the card and securely stored in the card. Providing such confidential data in commands opens a risk that the confidential data get leaked to an unauthorized entity.

The document [1] references a "card". Known cards are payment cards, SIM cards and identification cards. Document [1] originates from a technical environment where a card was embodied as an integrated circuit card having a card body and a chip module or chip and one or several interfaces integrated thereto. Meanwhile, also other form factors of card like devices are known. For example, for SIM cards, besides the form factor of the plug-in SIM card or pUICC or simply UICC, also the embedded UICC, eUICC, and the integrated UICC, iUICC, are known. Also for payment and identity cards, besides the stand-alone form factor of the traditional payment card and stand-alone identity card, integrated form factors integrated into a larger device such as a smart phone are known.

In combination with the present invention, a "card" is understood to be an entity having a functionality of a card, like a payment card, SIM card, or identity card, and which has an arbitrary form factor, including form factors stand-alone, plug-in, embedded, integrated.

In combination with the present invention, the "card" also has one or several interfaces to enable communication between the card and the host.

OBJECTIVE OF THE INVENTION

It is an object of the present invention to provide a secure channel initiation procedure with increased security.

SUMMARY OF THE INVENTION

The object of the invention is achieved by a procedure with following features, according to claim 1. Embodiments of the invention are presented in dependent claims.

In greater detail, the object of the invention is achieved by a procedure for initiating a secure communication session between a card and a host. A static encryption key is assigned to the card and is stored in the card. Each of the card and the host provide of a key version number and a key identifier of said static key.

The procedure comprising steps at the card:—receive, from the host, an INITIALIZE UPDATE command comprising a host challenge, which is a value unique to the session;

generate a card challenge, which is a value unique to the session, herein processing at least the card's static encryption key, key diversification data and a sequence counter with a first cryptographic function;

generate a session key, herein processing the card's static encryption key, the host challenge and the card challenge with a second cryptographic function;

calculate a card cryptogram using the session key;

send to the host an INITIALIZE UPDATE reply in which the card cryptogram, the sequence counter and the card challenge are comprised, to enable the host to verify the card cryptogram.

The procedure is characterized in that:

each of the card and the host provide of an SCP key identity associated with said key version number and said key identifier of the card's static encryption key;

the INITIALIZE UPDATE command comprises the SCP key identity, and doesn't comprise said key version number and said key identifier;

to generate the card challenge, in addition said key version number and said key identifier are processed with the first cryptographic function.

Due to the lack of the key version number and key identifier in the INITIALIZE UPDATE command, and their replacement by an anonymous SCP key identity, the key version number and key identifier cannot be spied out from the INITIALIZE UPDATE command. The anonymous SCP key identity, even if it is spied out, doesn't disclose any confidential key information. In order to provide to the card the required information on said key version number and said key identifier, said key version number and said key identifier are processed with the first cryptographic function and only provided in concealed form.

Accordingly, the present invention provides a secure channel initiation procedure with increased security.

According to some embodiments, the SCP key identity is comprised in a data field of said INITIALIZE UPDATE command.

According to some embodiments:

the field P1 of said INITIALIZE UPDATE command comprises, instead of a key version number, a fixed value, particularly 0xFF; and/or the field P2 of said INITIALIZE UPDATE command comprises, instead of a key identifier, a fixed value, particularly 0xFF.

Particularly, according to some embodiments, and in combination of two of the above embodiments, when the field P1 of said INITIALIZE UPDATE command comprises, instead of a key version number, a fixed value, particularly 0xFF, then the SCP key identity is comprised in a data field of said INITIALIZE UPDATE command. Preferably, in this case, also the field P2 of said INITIALIZE UPDATE command comprises, instead of a key identifier, a fixed value, particularly 0xFF.

According to some embodiments, the card comprises an card application, wherein the session is initiated between the card application and the host, wherein:—to generate the card challenge, in addition an application identifier, AID, of the card application is processed with the first cryptographic function.

According to some embodiments, each of the card and the host provides some or all of the following security parameters:

Security parameter tag;

length;

length of SCP key identity;

SCP key identity;

length of key version and/or key identifier;

key version and/or key identifier.

Preferably, the above identified security parameters are preconfigured to both the card and the host. The preconfiguring can be effected for example during card production, or for example later, during card personalization or during a card update.

BRIEF DESCRIPTION OF THE DRAWINGS

Embodiments of the invention will now be described with reference to the accompanying drawings, throughout which like parts are referred to by like references, and in which represents:

FIG. 2 secure channel initiation, according to the prior art [1];

FIG. 3 secure channel initiation, according to an embodiment of the invention;

FIG. 4 the inventive SCP key identity and further security parameters required to be provided to both the card and the off-card entity, before initiating a secure channel, according to embodiments of the present invention.

DETAILED DESCRIPTION OF THE INVENTION

Figure 1:
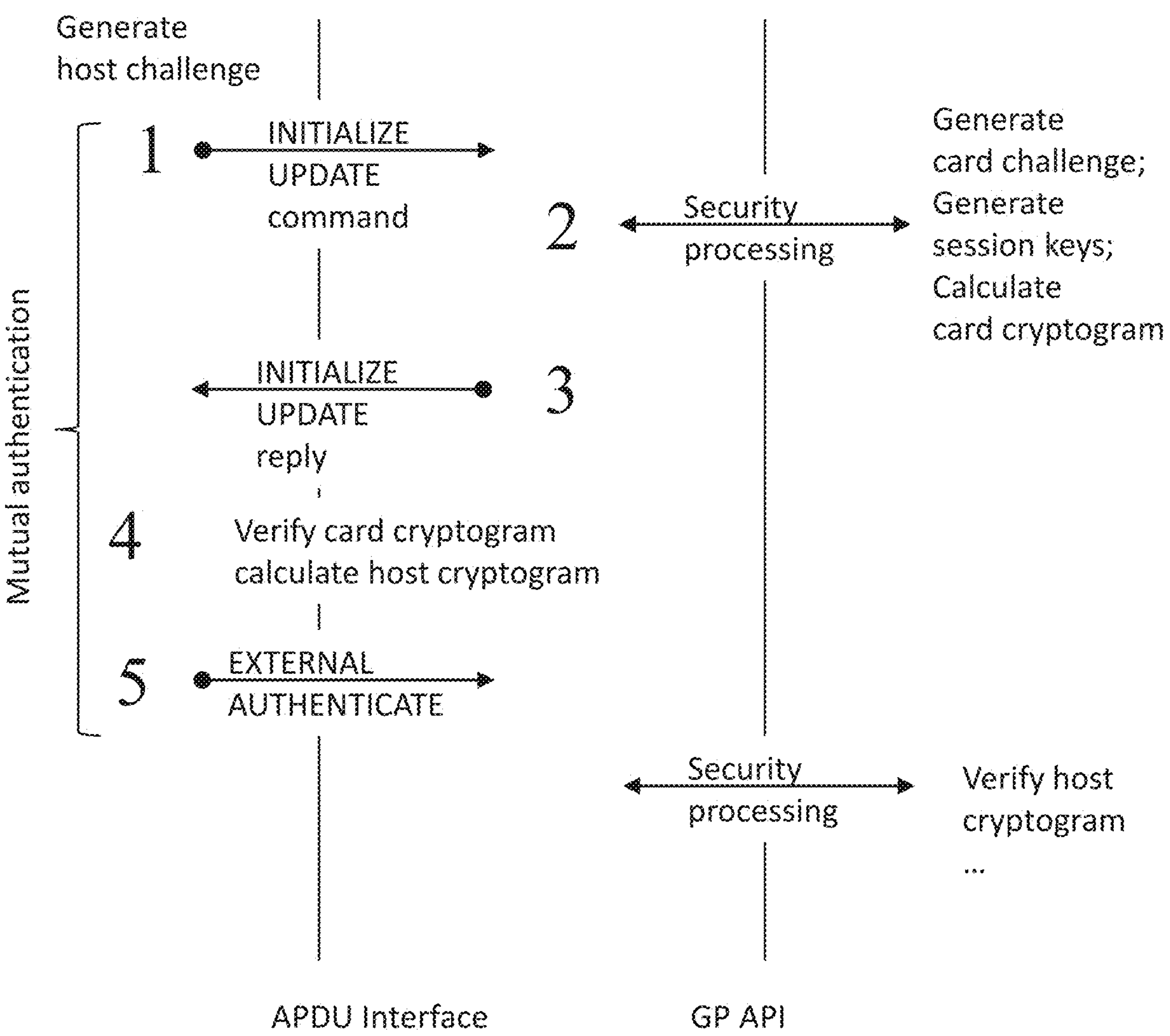
FIG. 1 detailed steps during secure channel initiation and subsequent steps, according to the prior art [1] and an embodiment of the invention.

FIG. 1 shows detailed steps during session initiation between an off-card entity, or host, on the one hand, and a card application implemented in a card on the other hand, and subsequent mutual authentication between the card and the off-card entity. The card application has access to a security domain for measures of security processing like executing crypto functions, generating card challenges, generating keys and calculating cryptograms based on keys and challenges.

1. The secure channel is initiated by an INITIALIZE UPDATE command sent by the off-card entity to the card application, herein passing a host challenge which was generated by the off-card entity to the card. The host challenge is a random or pseudo-random data element which is unique to the initiated session. According to the present invention, and as will be set out in greater detail below with reference to FIG. 3, depending on if the value of the code field is lower (<) than a preset value, e.g. 0xFF, or equals (=) said preset value, e.g. 0xFF, the INITIALIZE UPDATE command comprises either the standard content "key version" or the inventive content "SCP key identity".

2. The card application, on receipt of the host challenge, generates its own card challenge, which is also a random or pseudo-random data element which is unique to the session. The card application, using a sequence counter and static keys, creates new secret session keys and generates, by use of crypto-functions of the card, a first cryptographic value, the so-called card cryptogram, using one of its newly created session keys.

3. The card cryptogram along with the sequence counter, the card challenge, and other data is transmitted back to the off-card entity, in an INITIALIZE UPDATE reply. According to the present invention, instead of key information, secure channel information is transmitted in the INITIALIZE UPDATE reply, as will be set out in detail below with reference to FIG. 3.

4. As the off-card entity now has all the same information that the card used to generate the card cryptogram, it is able to generate the same session keys and the same card cryptogram and by performing a comparison, it is able to verify the card cryptogram, and hereby authenticate the card.

5. Subsequently, the off-card entity may now use a similar process to create a second cryptographic value (host cryptogram) to be passed back to the card (EXTERNAL AUTHENTICATE Command).

In the setup according to FIG. 1, preferably, one or several communication interfaces are provided between the of-card entity and the card which enable the off-card entity and the card to communication by means of APDU commands. APDU stands for Application Protocol Data Unit.

Further in the setup according to FIG. 1, preferably, the card application and the security domain executing crypto functions communication via a Global Platform Application Programing Interface, abbreviated GP API.

FIG. 2 shows secure channel initiation according to the prior art [1], for a card application implemented in a card, and having an application identifier AID. According to document [1] GPC_SPE_014 v2.3—Amendment D, Version 1.1.2, for initiation of a secure channel between a card and a host, an INITIALIZE UPDATE command is sent from the host to the card, and an INITIALIZE UPDATE reply is sent back from the card to the host. The INITIALIZE UPDATE command comprises, particularly, in a code field PI a key version number, and in a code field P2 a key identifier, and in a data field a host challenge which was generated by the host, all as defined in [1]. Both key version umber and key identifier are confidential key information. The INITIALIZE UPDATE reply comprises, particularly, 10 Bytes of key diversification data, three bytes of confidential key information, an eight bytes long card challenge which was generated by the card, an eight bytes long card cryptogram which was calculated by the card, and a three bytes long sequence counter.

The key diversification data is data typically used by a backend system to derive the card static keys. The key information includes the key version number, the secure channel protocol identifier, which is in the case of the SCP03 protocol '03', and the secure channel protocol "i" parameter used in initiating the secure channel session. The sequence counter is only present when SCP03 is configured for pseudo-random challenge generation.

In FIG. 2, the INITIALIZE UPDATE command and INITIALIZE UPDATE reply according to [1] comprise confidential data, particularly a key version number and a key identifier of a secret card's static encryption assigned to the card and securely stored in the card. Providing such confidential data in commands opens a risk that the confidential data get leaked to an unauthorized entity.

In greater detail, since in the INITIALIZE UPDATE command, the off-card entity sends key information like key version and key identifier (key index) in plain format, an attacker can easily find out information related to which key version and key ID is being to use for the subsequent mutual authentication. From key version in the present INITIALIZE UPDATE command, an attacker can easily find out which SCP protocol is being used.

Further according to FIG. 2, the card generates a card challenge. For this, following card challenge input is provided: a 12 byte label comprising or consisting of 11 bytes with value "00" followed by a one byte derivation constant as defined in [1], 2 bytes specifying the length in bits, a 1 byte counter, three bytes of sequence counter, and the application identifier AID of the card application. The card challenge input is processed by a crypto function of the card, applying a static encryption key of the card. The eight leftmost bytes of the output of said processing is the card challenge.

Further according to FIG. 2, the card generates a session key. For this, the eight byte long host challenge, the eight byte long card challenge and further bytes are processed by a crypto function of the card, applying said static encryption key of the card. The output of said processing is the session key S-ENC.

FIG. 3 shows secure channel initiation, according to an embodiment of the invention. Steps and elements shown likely to FIG. 2 are like to FIG. 2. The secure channel initiation according to FIG. 3 has following differences over the knowns procedure shown in FIG. 2.

According to FIG. 3, the INITIALIZE UPDATE command comprises, particularly, in a code field P1, either if the value of P1 is lower than a preset value, e.g. 0xFF, a key version number, or if the value of P1 equals said preset value, e.g. 0xFF, said preset value, and in an additional data field, the SCP key identity of the present invention. The inventive SCP key identity is an additional security parameter. It can have a length of for example one byte to ten bytes. In addition, also in a data field, there is provided the host challenge which was generated by the host. If P1 is filled with the known key version, then also P2 is filled with the known key identifier. If however P1 is said preset value, and doesn't contain the known key version, then also in P2 no key identifier is provided.

According to FIG. 3, the INITIALIZE UPDATE reply comprises, instead of three bytes of key information, one byte of secure channel information.

Further according to FIG. 3, the card generates a card challenge, herein deviating from the prior art in that also two bytes key version and key index find entry into the card challenge. For this, following card challenge input is provided: a 12 byte label comprising or consisting of 11 bytes with value "00" followed by a one byte derivation constant as defined in [1], 2 bytes specifying the length in bits, a 1 byte counter, three bytes of sequence counter, and the application identifier AID of the card application, and in addition, according to said embodiment of the invention, two bytes key version and key index associated with the inventive SCP key identity. The card challenge input is processed by a crypto function of the card, applying a static encryption key of the card. The eight leftmost bytes of the output of said processing is the card challenge.

Further according to FIG. 3, the card generates a session key. For this, the eight byte long host challenge, the eight byte long card challenge and further bytes are processed by a crypto function of the card, applying said static encryption key of the card. The output of said processing is the session key S-ENC.

FIG. 4 shows the inventive SCP key identity and further security parameters required to be provided to both the card and the off-card entity, before initiating a secure channel, according to an embodiment of the present invention. The following mandatory security parameters need to be provided to both the card and the off-card entity, before initiating a secure channel: a security parameter tag of length one byte; a length tag of length one byte; a length of SCP key identity of length one byte; the inventive SCP key identity, which can have a length of from one byte up to ten bytes; a length of key version/key identifier of length one byte; a key version/key identifier of length two bytes. Deviating byte lengths of some or all of the security parameters may be possible, whereas lengths of some or all of the security parameters may need to follow fixed values as preset in standards, so as to ensure interoperability of the card and host with cards and hosts of other market participants.

In the embodiments of FIG. 4, before a secure channel can be established between a card and a host using the SCP key identity, the security parameters of FIG. 4 need to be preconfigured to both the card and the host.

The invention claimed is:

1. A procedure for initiating a secure communication session between a card and a host, a static encryption key being assigned to the card and stored in the card, each of the card and the host providing a key version number and a key identifier of said static key, the procedure comprising steps at the card:

- receive, from the host, an INITIALIZE UPDATE command comprising a host challenge, which is a value unique to the session;
- generate a card challenge, which is a value unique to the session, herein processing at least the card's static encryption key, key diversification data and a sequence counter with a first cryptographic function;
- generate a session key (S-ENC), herein processing the card's static encryption key, the host challenge and the card challenge with a second cryptographic function;
- calculate a card cryptogram using the session key (S-ENC);
- send to the host an INITIALIZE UPDATE reply in which the card cryptogram, the sequence counter and the card challenge are comprised, to enable the host to verify the card cryptogram; wherein:
- each of the card and the host provide an SCP key identity associated with said key version number and said key identifier of the card's static encryption key;
- the INITIALIZE UPDATE command comprises the SCP key identity, and doesn't comprise said key version number and said key identifier;
- to generate the card challenge, in addition said key version number and said key identifier are processed with the first cryptographic function.

2. The procedure according to claim 1, wherein the SCP key identity is comprised in a data field of said INITIALIZE UPDATE command.

3. The procedure according to claim 1, wherein:

- the field P1 of said INITIALIZE UPDATE command comprises, instead of a key version number, a fixed value, particularly 0xFF; and/or
- the field P2 of said INITIALIZE UPDATE command comprises, instead of a key identifier, a fixed value, particularly 0xFF.

4. The procedure according to claim 1, wherein the card comprises an card application, and wherein the session is initiated between the card application and the host, and wherein: to generate the card challenge, in addition an application identifier, AID, of the card application is processed with the first cryptographic function.

5. The method according to claim 1, wherein each of the card and the host provides some or all of the following security parameters:

- Security parameter tag;
- length;
- length of SCP key identity;
- SCP key identity;
- length of key version and/or key identifier;
- key version and/or key identifier.

* * * * *